US006665481B2

(12) United States Patent
Hebgen et al.

(10) Patent No.: US 6,665,481 B2
(45) Date of Patent: Dec. 16, 2003

(54) LOW MPI DISPERSION COMPENSATING FIBER

(75) Inventors: Peter G. Hebgen, Horseheads, NY (US); Steven H. Tarcza, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 100 days.

(21) Appl. No.: 10/027,104

(22) Filed: Dec. 20, 2001

(65) Prior Publication Data

US 2003/0128943 A1 Jul. 10, 2003

(51) Int. Cl.[7] ................................. G02B 6/02
(52) U.S. Cl. ................... 385/123; 124/127; 398/152
(58) Field of Search ......................... 385/123, 127, 385/124, 126, 24, 37; 398/152, 106, 121, 164

(56) References Cited

U.S. PATENT DOCUMENTS

| 6,263,138 B1 | 7/2001 | Sillard et al. ............... 385/123 |
| 6,327,403 B1 | 12/2001 | Danziger et al. | |
| 6,445,864 B2 * | 9/2002 | Jiang et al. ................... 385/127 |

FOREIGN PATENT DOCUMENTS

| WO | WO0051269 | 8/2000 |
| WO | WO0067053 | 11/2000 |
| WO | WO 01/71391 | 9/2001 |
| WO | WO0173486 | 10/2001 |
| WO | WO0192931 | 12/2001 |

OTHER PUBLICATIONS

Fludger et al., Electrical Measurements of Multipath Interference in Distributed Raman Amplifiers, Journal of Lightwave Technology, vol. 19, No. 4, Apr., 2001.

* cited by examiner

*Primary Examiner*—Phan T. H. Palmer
(74) *Attorney, Agent, or Firm*—Randall S. Wayland (57) ABSTRACT

A dispersion compensating (DC) fiber preferably including a central segment having a relative refractive index, a depressed moat segment, an intermediate segment, an annular ring segment and a cladding layer. The relative refractive index profile of the DC fiber is selected to provide negative dispersion, negative dispersion slope, a κ value of less than or equal to about 100, and MPI of less than −40 dB at 1550 nm. The DC fiber preferably has a pin array bend loss of less than or equal to about 30 dB at a wavelength of about 1550 nm.

48 Claims, 4 Drawing Sheets

LOW MPI DISPERSION COMPENSATING FIBER

BACKGROUND OF THE INVENTION

1. Field of the Invention

The invention is directed to dispersion compensating (DC) fibers for use in telecommunication systems, and more particularly, to DC fibers for compensating for dispersion and dispersion slope of non-zero dispersion shifted fibers (NZDSF).

2. Technical Background

The increased demand for higher bit transmission rates has resulted in a large demand for optical transmission systems that can control dispersion effects. A linear analysis of common optical transmission systems indicates that while transmission systems can tolerate about 1,000 ps/nm residual dispersion at 10 Gbit/second, these systems tolerate only about 62 ps/nm residual dispersion at a higher transmission rate of 40 Gbit/second. Therefore, it is apparent that it is important to accurately control the dispersion for high bit-rate transmission systems, and that this control becomes increasingly important as the transmission rate increases. Further, the need to accurately control dispersion means that dispersion slope of a transmission fiber must also be compensated for as transmission rates approach 40 Gbit/second.

Various solutions have been proposed to achieve the low dispersion and dispersion slope values required for compensating NZDSFs, including: photonic crystal fibers, higher order mode dispersion compensation, dispersion compensating gratings and dual fiber dispersion compensating techniques. Each of these solutions has significant drawbacks associated therewith.

Photonic crystal fibers are designed to have a large negative dispersion and a negative dispersion slope that are close to those required for compensating NZDSFs. However, photonic crystal fibers have significant drawbacks including a relatively small effective area of about 10 $\mu m^2$ or less that leads to unacceptably high splice losses and, hence, require the use of a transition or bridge fiber to reduce splice losses. In addition, due to the very nature of photonic crystal fibers, i.e. glass/air interfaces in the core of the fiber, the related attenuation is unacceptable in the transmission window of interest. Further, photonic crystal fibers are significantly difficult to manufacture on a large scale and, therefore, expensive.

Higher order mode (HOM) dispersion compensation relies on the dispersion properties of higher order modes being transmitted in the fiber. It has been demonstrated that higher order modes, e.g. $LP_{02}$ and $LP_{11}$, have higher negative dispersion and dispersion slope than the fundamental mode. Higher order mode dispersion compensation typically relies on the conversion of a transmitted fundamental mode to one of the higher order modes via a mode converter. Subsequently, this HOM is propagated in the HOM fiber that supports that mode. After a finite distance, the HOM is coupled back to the fundamental mode via a second mode converting device. Problems associated with HOM dispersion compensation solutions include inefficient mode converters and the difficulty of producing HOM fibers that allow higher order mode transmission while resisting coupling to the fundamental mode.

Dispersion compensating gratings are utilized to achieve a required differential group delay via chirped gratings. Techniques utilizing dispersion compensating gratings have been shown to be useful for only narrow wavelength bands, as these techniques typically suffer from dispersion and dispersion slope ripple when the required grating length becomes large.

Dual fiber dispersion compensating solutions for NZDSFs are similar to the dispersion compensating gratings techniques described above in that the dispersion compensation and the slope compensation are separately treated. Typically, dual fiber dispersion compensating techniques include the use of a dispersion compensating fiber followed by a dispersion slope compensating fiber. Such solutions require the use of a dispersion slope compensating fiber that compensates for a relatively small dispersion slope. Extensive profile modeling of optical fibers has resulted in well-established correlations between dispersion slope, effective area and bend sensitivity. By increasing the role played by waveguide dispersion in a given fiber, it is possible to decrease the dispersion slope and even create a negative slope in some cases. However, as the effective area is decreased, the bend sensitivity of the fiber is increased. Effective area of the fiber can be increased at the expense of further degradation of the bend sensitivity. Decreasing the dispersion slope, or making the dispersion slope negative, results in working very close to the cut-off wavelength of the fundamental mode, which in turn makes the fiber more bend sensitive and results in greater signal loss at long wavelengths, i.e., wavelengths greater than 1560 nm. As a result of these relationships, it is extremely difficult to manufacture a viable DC fiber that compensates both dispersion and dispersion slope and that has the other desirable attributes, such as low attenuation, low bend loss and low multiple path interference (MPI).

Heretofore, the most viable broad band commercial technology available to reduce or eliminate dispersion has been DC fiber modules. As dense wavelength division multiplexing deployments increase to 16, 32, 40 and more channels, broadband DC products are desired. Telecommunication systems presently include single-mode optical fibers that are designed to enable transmission of signals at wavelengths around 1550 nm in order to utilize the effective and reliable erbium-doped fiber amplifiers currently available.

With continuing interest in higher bit-rate information transfer, i.e. greater than 40 Gbit/second, ultra-long reach systems, i.e., systems greater than 100 km in length, and optical networking, it has become imperative to use DC fibers in networks that carry data on NZDSFs. The combination of the early versions of DC fibers with NZDSFs effectively compensated dispersion at only one wavelength. However, higher bit-rates, longer reaches and wider bandwidths require dispersion slope to be more precisely compensated. Consequently, it is desirable for the DC fiber to have dispersion characteristics such that its dispersion and dispersion slope are closely matched to that of the transmission fiber.

As DC fibers are designed to adequately compensate for dispersion and dispersion slope across a wide wavelength band other optical characteristics of the resultant fiber are sacrificed, including bending performance, multiple path interference (MPI), and attenuation. For example, bending performance becomes critical when DC fibers of several kilometers in length are packaged for use within modules and wound about mandrels located therein. MPI may occur when an optical bit stream in a telecommunication system has two different paths that it travels. This can occur from multiple reflections from optical components, light traveling in different modes in a few-moded fiber, and can occur due to small inhomogeneities or macroscopic variations in the fiber's refractive index. In particular, these variations cause light to be scattered in all directions with some being coupled back into the fiber in the backwards direction. Such back-scattered light may undergo further Rayleigh scattering and be re-coupled into the forward direction thereby interfering with the primary signal. Measured MPI may include contributions from all of these mechanisms. MPI shows itself as noise in the optical link (showing up at the optical receiver) and degrades the performance of the system. MPI is typically defined as the ratio of the power in the secondary paths divided by the power in the primary path. It would, therefore, be desirable to develop an alternative DC fiber having the ability to compensate for dispersion and dispersion slope of non-zero dispersion shifted fibers over a wide wavelength band around 1550 nm, while simultaneously minimizing effects detrimental to signal propagation such as MPI, while simultaneously maintaining good attenuation and bend performance.

SUMMARY OF THE INVENTION

The present invention relates to a DC fiber and system utilizing the same that compensates for dispersion and dispersion slope of a NZDSF in the C band (1525 nm to 1565 nm). The DC fiber and systems disclosed herein enable good compensation for dispersion and dispersion slope of a NZDSF while achieving low MPI in the DC fiber. The DC fiber also maintains good bend performance and low attenuation.

One embodiment of the present invention relates to a DC fiber that includes a central core segment having a relative refractive index, a depressed moat segment on the periphery of the central core segment and having a relative refractive index that is less than the relative refractive index of the central core segment, and an intermediate segment on the periphery of the moat segment and having a relative refractive index that is less than the relative refractive index of the core segment and greater than the relative refractive index of the moat segment. The DC fiber also includes an annular ring segment on the periphery of the intermediate segment and having a relative refractive index that is less than the relative refractive index of the central core and greater than the relative refractive index of the intermediate segment, and a cladding layer on the periphery on the annular ring segment and having a relative refractive index that is less than the relative refractive index of the ring segment and greater than the relative refractive index of the moat segment.

In accordance with another embodiment, the relative refractive index profile of the DC fiber is selected to provide a negative dispersion at a wavelength of about 1550 nm, a negative dispersion slope at a wavelength of about 1550 nm, a κ (kappa) value of less than or equal to about 100 at a wavelength of about 1550 nm, and MPI of less than −40 dB at 1550 nm; more preferably less than −45 dB; and most preferably less than −50 dB. Preferably, the DC fiber also exhibits a pin array bend loss of less than or equal to about 30 dB; more preferably less than 20 dB; and most preferably less than 17 dB, all at 1550 nm.

A preferred embodiment of the present invention relates to a DC fiber that includes a central core segment having a relative refractive index and an outer radius, a depressed moat segment on the periphery of the central core segment and having a relative refractive index that is less than the relative refractive index of the central core segment, and an outer radius, and an intermediate segment on the periphery of the moat segment and having a relative refractive index that is less than the relative refractive index of the core segment and greater than the relative refractive index of the moat segment, and an outer radius. The DC fiber also includes an annular ring segment on the periphery of the intermediate segment and having a relative refractive index that is less than the relative refractive index of the central core segment and greater than the relative refractive index of the intermediate segment, an outer radius, and a cladding layer on the periphery of the annular ring segment and having a relative refractive index that is less than the relative refractive index of the ring segment and greater than the relative refractive index of the moat segment.

The relative refractive index percentages and radii of the central core segment, the depressed moat segment, the intermediate segment, the annular segment and cladding layer are chosen from the following ranges: the relative refractive index of the central core segment within the range of from about 1.51% to about 2.27%; the relative refractive index of the depressed moat segment within the range of from about −0.42% to about −0.62%; the relative refractive index of the intermediate segment within the range of from about 0.040% to about 0.060%; the relative refractive index of the annular ring segment within the range of from about 0.50% to about 0.74%; the outer radius of the central core segment within the range of from about 1.4 microns to about 2.1 microns; the outer radius of the depressed moat segment within the range of from about 4.1 microns to about 6.2 microns; the outer radius of the intermediate segment within the range of about 5.9 microns to about 8.2 microns; and, the outer radius of the annular ring segment within the range of from about 7.2 microns to about 10.2 microns.

The relative refractive index percentage and radii of the central core segment, the depressed moat segment, the intermediate segment, annular segment and cladding layer are further selected to provide: negative dispersion at a wavelength of about 1550 nm; negative dispersion slope at a wavelength of about 1550 nm; a κ value of less than or equal to about 100 at a wavelength of about 1550 nm; and MPI of less than −40 dB. Preferably also, the DC fiber exhibits pin array bend loss of less than or equal to about 30 dB at a wavelength of 1550 nm.

The present invention also includes optical communication systems employing DC fibers and modules in accordance with the embodiments described above.

The present invention system utilizes the DC fiber in accordance with the invention to substantially fully compensate for both dispersion and dispersion slope, thereby eliminating the need for high cost compensating materials and components and/or the required use of DC fibers that are difficult and expensive to manufacture and which contribute to significant signal loss. The present invention further compensates for both dispersion and dispersion slope while simultaneously minimizing MPI, as well as bend loss and attenuation.

Additional features and advantages of the invention will be set forth in the detailed description which follows and will be apparent to those skilled in the art from the description or recognized by practicing the invention as described in the description which follows, together with the claims and appended drawings.

It is to be understood that the foregoing description is exemplary of the invention only and is intended to provide an overview for understanding the nature and character of the invention as it is defined in the claims. The accompanying drawings are included to provide a further understanding of the invention and are incorporated and constitute part of this specification. The drawings illustrate various features and embodiments of the invention, which, together with their description serve to explain the principles and operation of the invention.

DETAILED DESCRIPTION OF THE PREFERRED EMBODIMENT

For purposes of the description herein, it is to be understood that the invention may assume various alternative structure, except where expressly specified to the contrary. It is also to be understood that the specific apparatus illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

Definitions

The following definitions and terminology are commonly used in the art.

The radii of the segments of the core are defined in terms of the index of refraction of the material of which the segment is made. A particular segment has a first and a last refractive index point. A central segment has an inner radius of zero because the first point of the segment is on the segment's center line. The outer radius of the central segment is the radius drawn from the waveguide center line to the last point of the refractive index of the central segment. For a segment having a first point away from the center line, the radius of the waveguide center line to the location of its first refractive index point is the inner radius of that segment. Likewise, the radius from the waveguide center line to the location of the last refractive index point of the segment is the outer radius of that segment.

The segment radii may be conveniently defined in a number of ways. In this application, radii are defined in accord with the figures, described in detail below.

The definitions of segment radius and refractive index, used to describe refractive index profile, in no way limit the invention.

The effective area is generally defined as, $$A_{\mathit{eff}} = 2\pi (\int E^2 r dr)^2 / (\int E^4 r dr),$$

wherein the integration limits are 0 to $\infty$, and E is the electric field associated with the propagated light.

The relative refractive index of a segment, $\Delta\%$, as used herein, is defined by the equation, $$\Delta\% = 100 \times (n_i^2 - n_c^2)/2n_c^2,$$

where $n_i$ is the maximum refractive index of the index profile segment denoted as i, and $n_c$, the reference refractive index, is taken to be the refractive index of the clad layer. Every point in the segment has an associated relative index. The maximum relative index is used to conveniently characterize a segment whose general shape is known.

The term relative refractive index profile or index profile is the relation between $\Delta\%$ or refractive index and radius over a selected segment of the core.

The bend resistance of a waveguide fiber is expressed as induced attenuation under prescribed test conditions. The bend test referenced herein is the pin array bend test that is used to compare relative resistance of waveguide fiber to bending. To perform the test, attenuation loss is measured for a waveguide fiber with essentially no induced bending loss. The waveguide fiber is then woven in a serpentine path through the pin array and attenuation again measured. The loss induced by bending is the difference between the two measured attenuation values. The pin array is a set of ten cylindrical pins arranged in a single row and held in a fixed position on a flat surface. The pin spacing is 5 mm, center to center. The pin diameter is 0.67 mm. During testing, sufficient tension is applied to make the serpentine woven waveguide fiber conform to the portions of the pin surface at which there is contact between the pin and the fiber.

The term MPI of a DC fiber is Mutiple Path Interference (MPI) and is attributed to the mechanisms described above as a light signal traverses along the length of the DC fiber. MPI may be readily measured as follows:

$$MPI = 10 * \mathrm{Log}\left\{\frac{P_{secondary}}{P_{primary}}\right\} \mathrm{dB}$$

where $P_{secondary}$ is the power in the secondary path(s), and $P_{primary}$ is the power in the primary path.

The measurement of MPI is accomplished by launching continuous wave light from a distributed feedback laser into a first end of a length of DC fiber. The length tested is the length of fiber present on the module (typically 2–5 km). The launched signal is detected by a detector (E.g., a photodiode) connected, and optically coupled, to a second end of the DC fiber. The frequency content of the signal is measured with an electrical spectrum analyzer (ESA). The ESA detects the frequency content of the beat noise of the signal. In particular, it detects beat noise between the primary and secondary paths to derive the MPI measurement. The greater amount of beat noise, the greater amount of MPI. The noise spectrum data is then fit to a hypothetical curve from a family of curves representing various levels of multipath mixing of the optical signals to obtain the MPI of the DC fiber. Further details on the measurement of MPI may be found in the Journal of Lightwave Technology, Vol. 19, No. 4, April, 2001 entitled "Electrical Measurements of Mulipath Interference in Distributed Raman Amplifiers" by Chris R. S. Fludger and Robert J. Mears. In particular, equation 18 in that Journal paper will provide an MPI measure when the following function:

$$RIN_{mpi}(f) = 2(MPI)\frac{\frac{2\Delta v}{\pi}}{1+(f/\Delta v)^2},$$

is best fit to the data measured by the ESA using MPI as the free parameter.

The relationship between a transmission fiber and a DC fiber that substantially completely compensates for the dispersion of the transmission fiber at a particular wavelength follows the general equation of:

$$D_{DC}(\lambda)L_{DC} = -D_T(\lambda)L_T,$$

wherein $D_{DC}(\lambda)$ is the dispersion of the dispersion compensating fiber at a wavelength $\lambda$, $L_{DC}$ is the length of the dispersion compensating fiber, $D_T(\lambda)$ is the dispersion of the transmission fiber at a wavelength $\lambda$, $\lambda$ is a wavelength within the optical transmission band, and $L_T$ is the length of the transmission fiber. This desired relationship of dispersion between the DC fiber and the transmission fiber holds true for DC fibers constructed of multiple lengths of DC fibers.

The desired relationship of the κ of the optical fibers in a transmission line is as follows:

$$\kappa_{DC}(\lambda) = \frac{D(\lambda)_{DC}}{S(\lambda)_{DC}} = \kappa_T(\lambda) = \frac{D(\lambda)_T}{S(\lambda)_T},$$

wherein $\kappa_{DC}(\lambda)$ is the κ value for the DC fiber at wavelength $\lambda$, $D(\lambda)_{DC}$ is the dispersion for the dispersion compensating fiber at wavelength $\lambda$, $S(\lambda)_{DC}$ is the dispersion slope for the DC fiber at wavelength $\lambda$, $\kappa_T(\lambda)$ is the κ value for the transmission fiber at wavelength $\lambda$, $D(\lambda)_T$ is the dispersion for the transmission fiber at wavelength $\lambda$, and $S(\lambda)_T$ is the dispersion slope for the transmission fiber at wavelength $\lambda$. It should be recognized that desirably, the κ values of the DC fiber and transmission fiber should be selected and designed to be as equal as practicable across the entire wavelength band.

Figure 1:
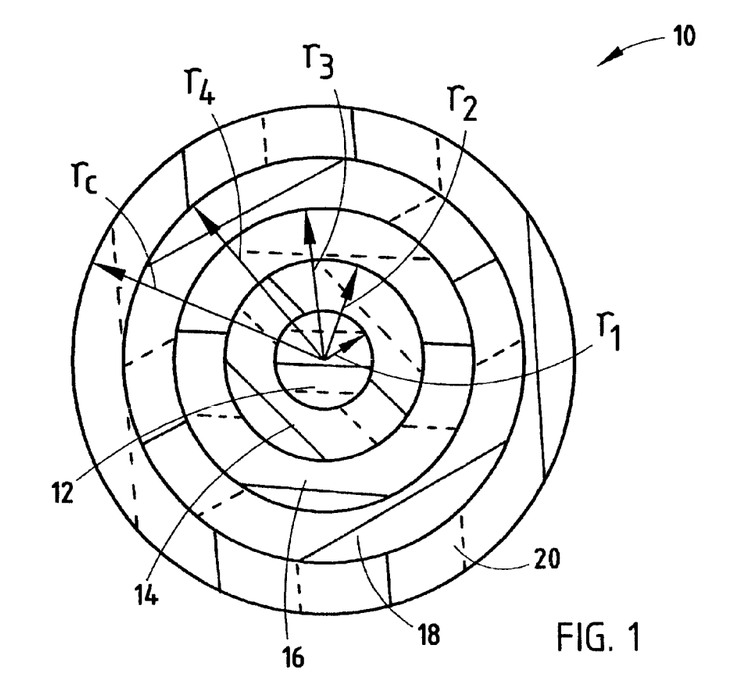
FIG. 1 is a schematic cross-sectional end view of a DC fiber waveguide embodying the present invention.

The DC fiber described and disclosed herein has a generally segmented structure, as shown in FIG. 1. Each of the segments is described by a refractive index profile, relative refractive index percent, $\Delta_i$, and an outside radius, $r_i$. The subscript i for the r and $\Delta$ refers to a particular segment. The segments are numbered $r_1$ through $r_c$ beginning with the innermost segment that includes the waveguide longitudinal axis center line. A clad layer having a refractive index of $n_c$ surrounds the DC fiber. In the illustrated example, the DC fiber 10 includes a central core segment 12 having an outer radius $r_1$, a depressed moat segment 14 having an outer radius $r_2$, an intermediate segment 16 having an outer radius $r_3$, an annular ring segment 18 having an outer radius $r_4$, and a cladding layer 20 having an outer radius $r_c$. For clarity, the dimensions shown in FIG. 1 are not drawn to scale.

Figure 2:
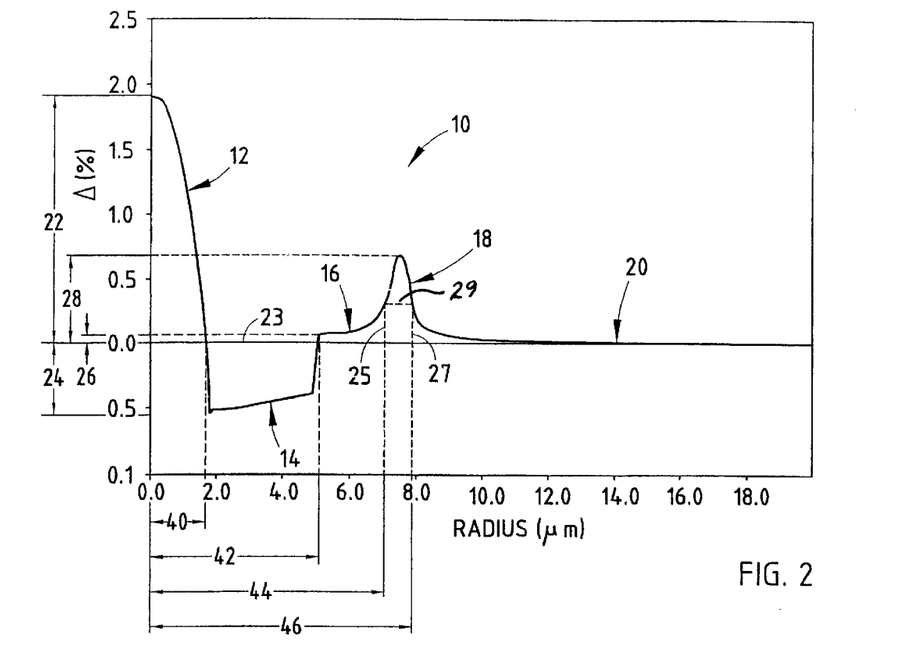
FIG. 2 is a diagram of a waveguide refractive index profile of a first embodiment of the DC fiber in accordance with the invention.

A general representation of the relative refractive index profile of the DC fiber 10 according to a first embodiment is illustrated in FIG. 2, which shows relative refractive index percent charted versus the DC fiber radius. Although FIG. 2 shows only four discreet segments, it is understood that the functional requirements may be met by forming a DC fiber having more than four segments. However, embodiments having fewer segments are usually easier to manufacture and are therefore preferred. Further, the DC fiber 10 may be constructed via a variety of methods including, but in no way limited to, vapor axial deposition (VAD), modified chemical vapor deposition (MCVD), plasma chemical vapor deposition (PCVD) and outside vapor deposition (OVD). DC fiber 10 is preferably constructed utilizing an OVD process.

The central core segment 12 of DC fiber 10 has a relative refractive index percent 22, $\Delta_1$, preferably within the range of from about 1.51% to about 2.27%, more preferably within the range of from about 1.70% to about 2.08%, and most preferably within the range of from about 1.80% to about 1.98%. As also seen in FIG. 2, central core segment 12 also has an outer radius 40, $r_1$, within the range of from about 1.4 microns to about 2.1 microns, more preferably within the range of from about 1.6 microns to about 1.9 microns, and most preferably within the range of from about 1.6 microns to about 1.8 microns. The radius 40, $r_1$, is defined by the intersection of the profile of central core segment 12 with the horizontal axis 23 corresponding with the profile relative refractive index of cladding layer 20, which is preferably constructed of pure silica.

The depressed moat segment 14 of fiber 10 has a relative refractive index percent 24, $\Delta_2$, of less than about −0.42% (at its deepest point), more preferably within the range of from about −0.61% to about −0.42%, and most preferably within the range of from about −0.58% to about −0.50%. Moat segment 14 also has an outer radius 42, $r_2$, within the range of from about 4.1 microns to about 6.8 microns, more preferably within the range of from about 4.6 microns to about 6.3 microns, and most preferably within the range of from about 4.9 microns to about 5.9 microns. The outer radius 42, $r_2$, is the intersection of moat segment 14 and intermediate segment 16. In the illustrated example, the outer radius 42, $r_2$, is defined by the intersection of the profile of moat segment 14 with the horizontal axis 23 corresponding with the profile of cladding layer 20.

The intermediate segment 16 of DC fiber 10 has a relative refractive index percent 26, $\Delta_3$, within the range of from about 0.04% to about 0.072%, more preferably within the range of from about 0.045% to about 0.066%, and most preferably within the range of from about 0.048% to about 0.063%. Intermediate segment 16 also has an outer radius 44, $r_3$, within the range of from about 5.5 microns to about 8.5 microns, more preferably within the range of from about 6.2 microns to about 7.8 microns, and most preferably within the range of from about 6.5 microns to about 7.4 microns. The outer radius 44, $r_3$, is the intersection of intermediate segment 16 and ring segment 18. As illustrated, the radius 44, $r_3$, is measured from the fiber centerline to a vertical line 25 depending from the half maximum relative index point of the ascending portion of ring segment 18. The half maximum point is determined using cladding layer 20, i.e., $\Delta\%=0$ and the maximum relative refractive index percent 28 of the ring segment 18 as reference points(i.e., the point corresponding to half the $\Delta_4$ value).

The annular ring segment 18 of DC fiber 10 has a relative refractive index percent 28, $\Delta_4$, within the range of from about 0.50% to about 0.80%, more preferably of within the range of from about 0.56% to about 0.74%, and most preferably within the range of from about 0.59% to about 0.70%. Ring segment 18 also has an outer radius 46, $r_4$, of within the range of from about 7.2 microns to about 10.2 microns, more preferably of within the range of from about 7.4 microns to about 9.2 microns, and most preferably of within the range of from about 7.7 microns to about 8.8 microns. Outer radius 18, $r_4$, is located at the intersection of ring segment 18 with the half height line 29. As illustrated, radius 46, $r_4$, is measured from the fiber centerline to a vertical line 27 depending from the half maximum relative index point of the descending portion of ring segment 18. The half maximum point is determined using cladding layer 20, i.e., $\Delta\%=0$ and the maximum relative refractive index 28 as a reference.

The outer radius 46, $r_4$, of ring segment 18 is also the inner radius of cladding layer 20. Cladding layer 20 surrounds ring segment 46 and has a relative refractive index percent, $\Delta_c$, of approximately 0%, and an outer radius, $r_c$, of about 62.5 microns.

The DC fiber 10 of the present invention exhibits optical properties at a wavelength of about 1550 nm, including: preferred dispersion of less than 0, more preferably of within the range of from about −80 ps/nm-km to about −200 ps/nm-km, and most preferably of within the range of from about −110 ps/nm-km to about −160 ps/nm-km; a preferred κ of less than 100, more preferably of within the range of from about 40 to about 95, and most preferably of within the range of from about 45 to about 75; a MPI of less than about −40 dB at 1550 nm, more preferably less than −45 dB at 1550 nm, and most preferably less than −50 dB at 1550 nm, a preferred pin array bend loss of less than 30 dB, more preferably of less than about 20 dB, and most preferably of less than about 17 dB; and, a preferred ratio of the outer diameter of the core segment to the outer diameter of the moat segment of less than about 0.360, more preferably of within the range of from about 0.28 to about 0.34, and most preferably of within the range of from about 0.30 to about 0.325.

MPI of the DC fiber 10 may be improved by moving the location of the ring segment 18 further toward the centerline of the DC fiber 10. Further improvements may be made by decreasing the relative refractive index percent 28, $\Delta_4$. Making the moat segment 14 shallower further lowers MPI. Moreover, the moat segment may be made narrower thereby reducing MPI. Of course, any of these in combination will have an affect and several or all of these parameters would be adjusted simultaneously to affect changes in MPI while obtaining the appropriate kappa and acceptable bend loss.

EXAMPLE 1

The diagram of FIG. 2 illustrates an example of the DC fiber 10 that includes central core segment 12, depressed moat segment 14, intermediate segment 16, annular ring segment 18 and cladding layer 20.

Core segment 12 has a relative index 22, $\Delta_1$, of about 1.89%, and an outer radius 40, $r_1$, of about 1.73 microns. Moat segment 14 has a relative refractive index 24, $\Delta_2$, of about −0.52%, and an outer radius 42, $r_2$, of about 5.15 microns. Intermediate segment 16 has a relative refractive index 26, $\Delta_3$, of about 0.05%, and an outer radius 44, $r_3$, of about 7.08 microns. Ring segment 18 has a relative refractive index 28, $\Delta_4$, of about 0.65%, and an outer radius 46, $r_4$, of about 7.9 microns. Cladding layer 20 has a relative refractive index, $\Delta_c$, of about 0%, and an outer radius, $r_c$, of about 62.5 microns. The ratio of the outer diameter 40, $r_1$, of core segment 12 to the outer diameter 42, $r_2$, of moat segment 14 for fiber 10 is about 0.336.

The optical properties of the DC 10 of FIG. 2, are given in Table 1.

TABLE 1

| OPTICAL PROPERTIES FOR FIBER EXAMPLE 1 | |
| --- | --- |
| Dispersion (ps/nm-km) at 1550 nm | −155 |
| Dispersion Slope (ps/nm²-km) at 1550 nm | −1.80 |
| kappa at 1550 nm | 86 |
| MPI (dB) at 1550 nm | −55 |
| Pin Array Bend Loss (dB) at 1550 nm | 16.0 |
| Effective Area ($\mu m^2$) at 1550 nm | 16.5 |
| Cutoff Wavelength (nm) $LP_{02}$ | 1689 |
| Cutoff Wavelength (nm) $LP_{11}$ | 1937 |

EXAMPLE 2

Figure 3:
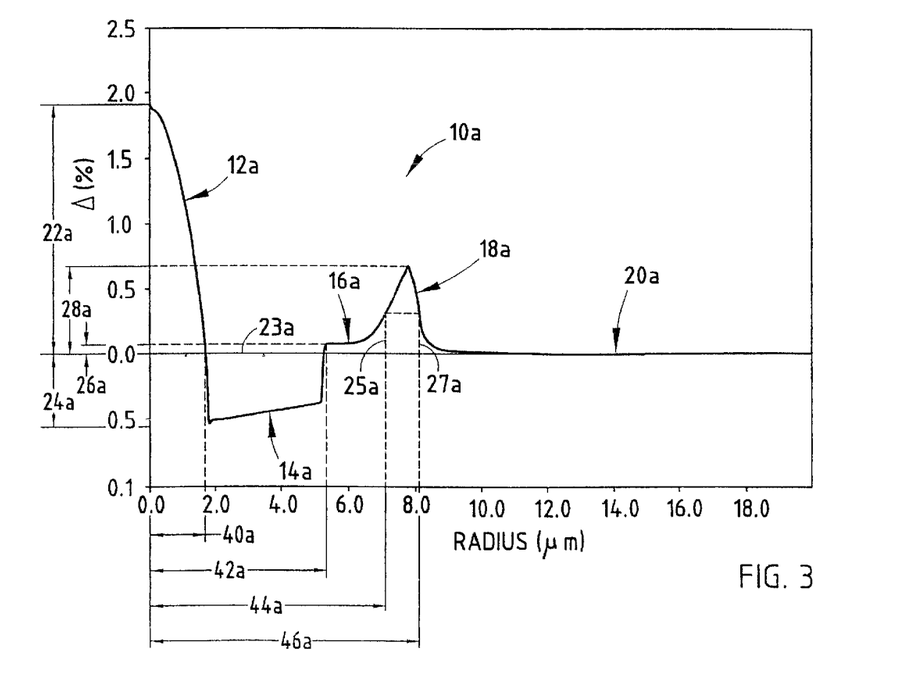
FIG. 3 is a diagram of a waveguide refractive index profile of a second embodiment of the DC fiber in accordance with the invention.

Another example of the DC fiber in accordance with the invention is shown in FIG. 3. Since DC fiber 10a is similar to the previously described compensation fiber 10, similar parts appearing in FIG. 2 and FIG. 3 are respectively represented by the same, corresponding reference numeral, except for the suffix "a" and the numerals of the latter.

DC fiber 10a includes central core segment 12a, depressed moat segment 14a, intermediate segment 16a, annular ring segment 18a, and cladding layer 20a. Core segment 12a has a relative refractive index 22a, $\Delta_1$, of about 1.89%, and an outer radius 40a, $r_1$, of about 1.73 microns. The moat segment 14a has a relative refractive index 24a, $\Delta_2$, of about −0.52%, and an outer radius 42a, $r_2$, of about 5.45 microns. Intermediate segment 16a has a relative refractive index 26a, $\Delta_3$, of about 0.06%, and an outer radius 44a, $r_3$, of about 6.85 microns. Ring segment 18a has a relative refractive index 28a, $\Delta_4$, of about 0.67%, and an outer radius 46a, $r_4$, of about 8.1 microns. Cladding layer 20a has a relative refractive index of about 0%, and an outer radius of about 62.5 microns. The ratio of outer diameter 40a, $r_1$, of core segment 12a to outer diameter 42a, $r_1$, of moat segment 14a is about 0.317.

The optical properties of DC fiber 10a of FIG. 3, are given in Table 2.

TABLE 2

| OPTICAL PROPERTIES FOR FIBER EXAMPLE 2 | |
| --- | --- |
| Dispersion (ps/nm-km) at 1550 nm | −155 |
| Dispersion Slope (ps/nm²-km) at 1550 nm | −2.04 |
| kappa at 1550 nm | 76 |
| MPI (dB) at 1550 nm | −55 |
| Pin Array Bend Loss (dB) at 1550 nm | 22.7 |
| Effective Area ($\mu m^2$) at 1550 nm | 16.6 |
| Cutoff Wavelength (nm) $LP_{02}$ | 1680 |
| Cutoff Wavelength (nm) $LP_{11}$ | 1888 |

EXAMPLE 3

Figure 4:
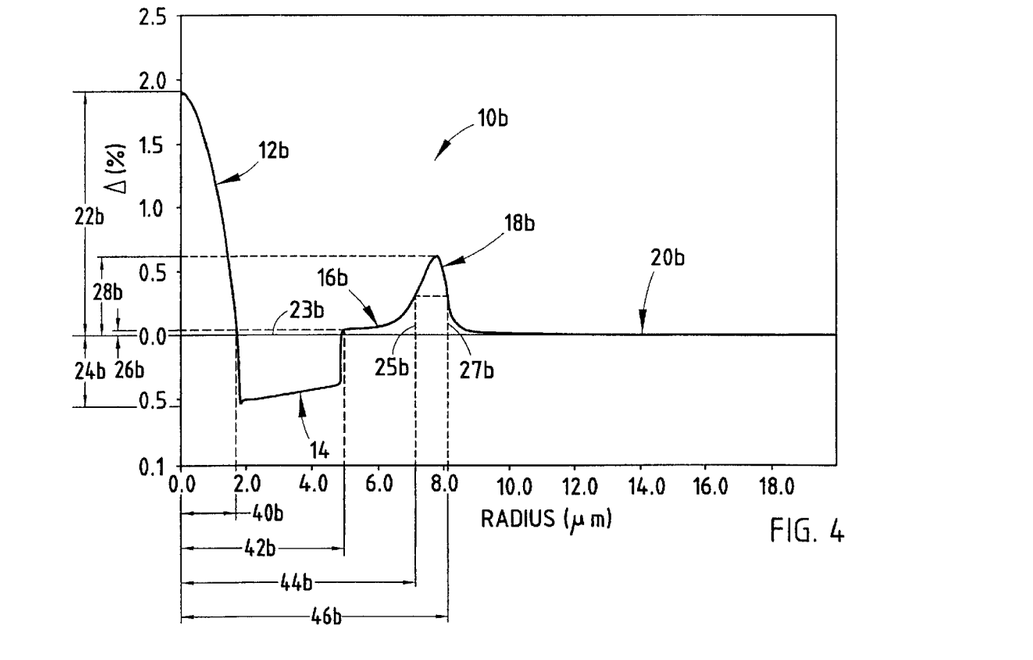
FIG. 4 is a diagram of a waveguide refractive index profile of a third embodiment of the DC fiber in accordance with the invention.

A further example of the DC fiber in accordance with the invention is shown in FIG. 4. Since DC fiber 10b is similar to previously described DC fiber 10, similar parts appearing in FIG. 2 and FIG. 4 respectively are represented by the same, corresponding reference numeral, except for the suffix "b" in the numerals of the latter.

DC fiber 10b includes central core segment 12b, depressed moat segment 14b, intermediate segment 16b, annular ring segment 18b, and cladding layer 20b. Core segment 12b has a relative refractive index 22b, $\Delta_1$, of about 1.89%, and an outer radius 40b, $r_1$, of about 1.73 microns.

The moat segment 14b has a relative refractive index 24b, $\Delta_2$, of about −0.52%, and an outer radius 42b, $r_2$, of about 5.4 microns. Intermediate segment 16b has a relative refractive index 26a, $\Delta_3$, of about 0.06%, and an outer radius 44a, $r_3$, of about 6.85 microns. Ring segment 18a has a relative refractive index 28a, $\Delta_4$, of about 0.67%, and an outer radius 46b, $r_4$, of about 8.1 microns. Cladding layer 20b has a relative refractive index of about 0%, and an outer radius of about 62.5 microns. The ratio of the outer diameter 40b, $r_1$, of core segment 12a to the outer radius 42b, $r_2$, of moat segment 14b is about 0.320.

The optical properties of DC fiber 10b of FIG. 4, are given in Table 3.

TABLE 3

OPTICAL PROPERTIES FOR FIBER EXAMPLE 3

| | |
|---|---|
| Dispersion (ps/nm-km) at 1550 nm | −154 |
| Dispersion Slope (ps/nm²-km) at 1550 nm | −2.08 |
| kappa at 1550 nm | 74 |
| MPI (dB) at 1550 nm | −55 |
| Pin Array Bend Loss (dB) at 1550 nm | 16.7 |
| Effective Area ($\mu m^2$) at 1550 nm | 16.5 |
| Cutoff Wavelength (nm) $LP_{02}$ | 1692 |
| Cutoff Wavelength (nm) $LP_{11}$ | 1957 |

EXAMPLE 4

Figure 5:
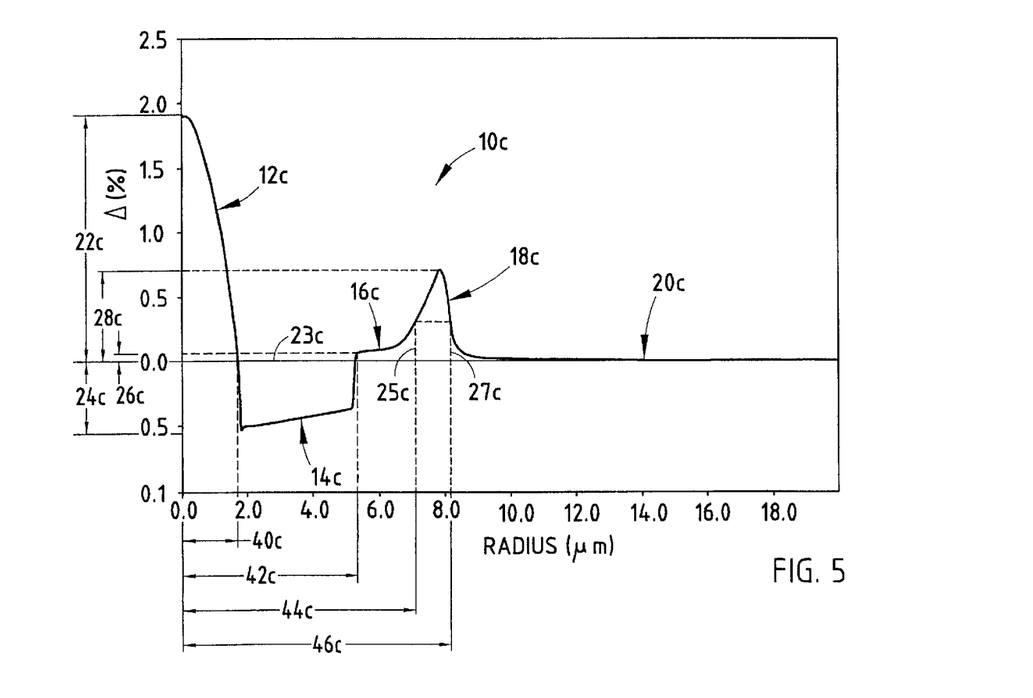
FIG. 5 is a diagram of a waveguide refractive index profile of a fourth embodiment of the DC fiber in accordance with the invention.

Another example of the DC fiber in accordance with the invention is shown in FIG. 5. Since DC fiber 10c is similar to the previously described DC fiber 10, similar parts appearing in FIG. 2 and FIG. 5 respectively are represented by the same, corresponding reference numeral, except for the suffix "c" in the numerals of the latter.

DC fiber 10c includes central core segment 12c, depressed moat segment 14c, intermediate segment 16c, annular ring segment 18c, and cladding layer 20c. Core segment 12c has a relative refractive index 22c, $\Delta_1$, of about 1.89%, and an outer radius 40c, $r_1$, of about 1.73 microns. Moat segment 14c has a relative refractive index 24c, $\Delta_2$, of about −0.52%, and an outer radius 42c, $r_2$, of about 5.69 microns. Intermediate segment 16c has a relative refractive index 26c, $\Delta_3$, of about 0.06%, and an outer radius 44c, $r_3$, of about 6.9 microns. Ring segment 18c has a relative refractive index 28c, $\Delta_4$, of about 0.62%, and an outer radius 46c, $r_4$, of about 8.2 microns. Cladding layer 20c has a relative refractive index of about 0%, and an outer radius of about 62.5 microns. The ratio of the outer diameter 40a, $r_1$, of core segment 12c to the outer diameter 42c, $r_2$, of moat segment 14c is about 0.304.

The optical properties of DC fiber 10c of FIG. 5, are given in Table 4.

TABLE 4

OPTICAL PROPERTIES FOR FIBER EXAMPLE 4

| | |
|---|---|
| Dispersion (ps/nm-km) at 1550 nm | −150 |
| Dispersion Slope (ps/nm²-km) at 1550 nm | −2.24 |
| kappa at 1550 nm | 67 |
| MPI (dB) at 1550 nm | −55 |
| Pin Array Bend Loss (dB) at 1550 nm | 27.7 |
| Effective Area ($\mu m^2$) at 1550 nm | 15.9 |
| Cutoff Wavelength (nm) $LP_{02}$ | 1675 |
| Cutoff Wavelength (nm) $LP_{11}$ | 1872 |

EXAMPLE 5

Figure 6:
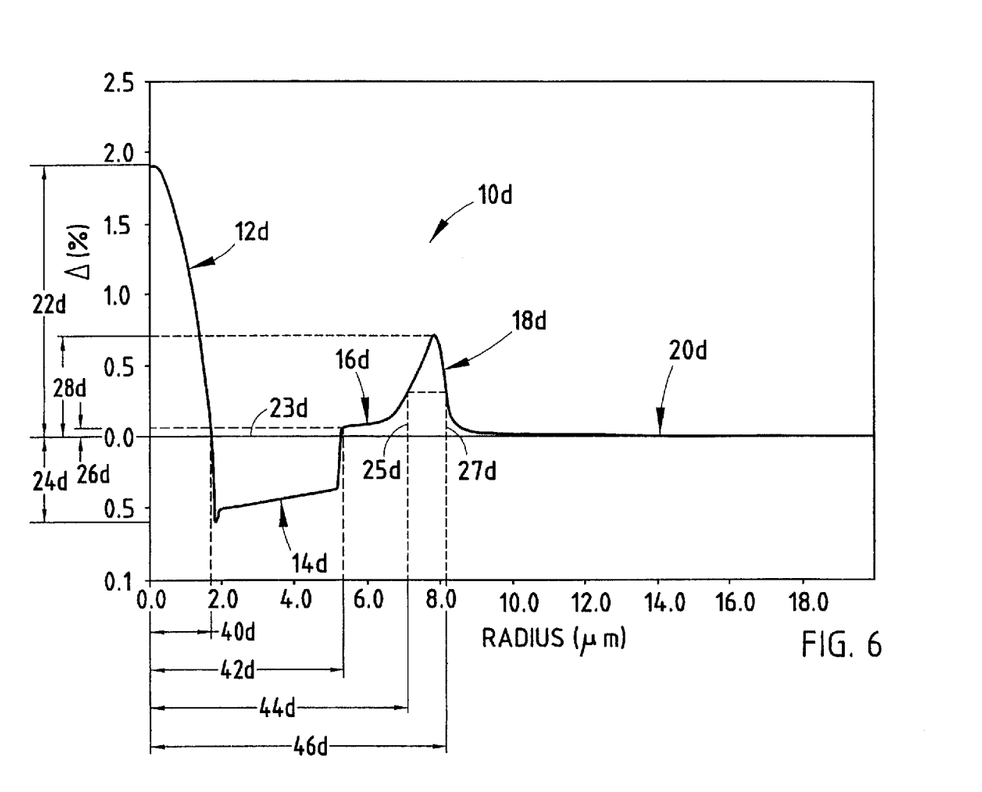
FIG. 6 is a diagram of a waveguide refractive index profile of a fifth embodiment of the DC fiber in accordance with the invention.

Yet another example of the novel DC fiber is shown in FIG. 6. Since DC fiber 10d is similar to the previously described DC fiber 10, similar parts appearing in FIG. 2 and FIG. 6 respectively are represented by the same, corresponding reference numeral, except for the suffix "d" in the numerals of the latter.

DC fiber 10d includes central core segment 12d, depressed moat segment 14d, intermediate segment 16d, annular ring segment 18d, and cladding layer 20d. Core segment 12d has a relative refractive index 22d, $\Delta_1$, of about 1.89%, and an outer radius 40d, $r_1$, of about 1.73 microns. Moat segment 14d has a relative refractive index 24d, $\Delta_2$, of about −0.55%, and an outer radius 42d, $r_2$, of about 5.69 microns. Intermediate segment 16d has a relative refractive index 26d, $\Delta_3$, of about 0.06%, and an outer radius 44d, $r_3$, of about 6.9 microns. Ring segment 18d has a relative refractive index 28d, $\Delta_4$, of about 0.62%, and an outer radius 46d, $r_4$, of about 8.2 microns. Cladding layer 20d has a relative refractive index of about 0%, and an outer radius of about 62.5 microns. The ratio of the outer diameter 40d, $r_1$, of core segment 12d to outer diameter 42d, $r_2$, of moat segment 14d is about 0.304.

The optical properties of the compensation fiber 10d of FIG. 6, are given in Table 5.

TABLE 5

OPTICAL PROPERTIES FOR FIBER EXAMPLE 5

| | |
|---|---|
| Dispersion (ps/nm-km) at 1550 nm | −119 |
| Dispersion Slope (ps/nm²-km) at 1550 nm | −1.65 |
| kappa at 1550 nm | 72 |
| MPI (dB) at 1550 nm | −55 |
| Pin Array Bend Loss (dB) at 1550 nm | 16.8 |
| Effective Area ($\mu m^2$) at 1550 nm | 15.1 |
| Cutoff Wavelength (nm) $LP_{02}$ | 1691 |
| Cutoff Wavelength (nm) $LP_{11}$ | 1889 |

Figure 7:
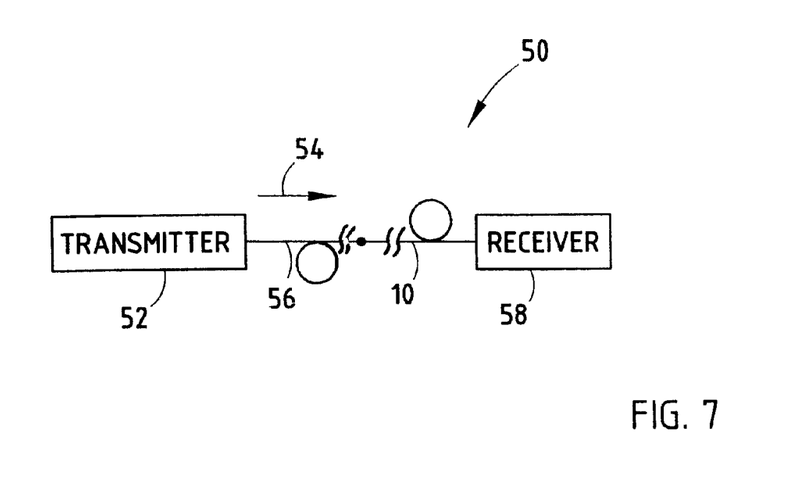
FIG. 7 is a schematic block diagram of a fiber optic communication system employing the DC fiber of the present invention.

The DC fiber 10 (10a, 10b, 10c, and 10d) manufactured in accordance with the present invention may be used in an optical fiber communication system 50, as shown in FIG. 7. System 50 includes an optical transmitter 52 adapted to transmit an optical signal in a direction indicated by arrow 54 through an optical waveguide transmission fiber 56 which is in optical communication with transmitter 52. System 50 also includes the optical waveguide compensation fiber 10 (10a, 10b, 10c, and 10d) in optical communication with transmission fiber 56 and an optical receiver 58 adapted to receive the optical signal 54. Fiber 10 (or 10a, 10b, 10c, and 10d), may be employed within system 50 in a coil form within a box, or in any other form or packaging as known in the art. In most systems, both ends of transmission fiber 56 and compensation fiber 10 (or 10a, 10b, 10c, and 10d) will be capable of two-way signal transmissions, and transmitter 52 and receiver 58 are shown for illustration only. The system 50 may include further components such as preamplifiers, power amplifiers and the like, not shown for clarity.

It will become apparent to those skilled in the art that various modifications to the preferred embodiment of the invention and the examples as described and illustrated herein can be made without departing from the scope of the invention as defined by the appended claims.

What is claimed is:

1. A dispersion compensating optical fiber, comprising:
   a relative refractive index profile selected to provide
      a negative dispersion at a wavelength of about 1550 nm;
      a negative dispersion slope at a wavelength of about 1550 nm;

a k value of less than or equal to about 100 at a wavelength of about 1550 nm; and a MPI of less than −40 dB at 1550 nm.

2. The optical fiber of claim 1, further comprising:

a central core segment having a relative refractive index;

a depressed moat segment on the periphery of the central core segment and having a relative refractive index that is less than the relative refractive index of the central core segment;

an intermediate segment on the periphery of the moat segment and having a relative refractive index that is less than the relative refractive index of the core segment and greater than from the relative refractive index of the moat segment;

an annular ring segment on the periphery of the intermediate segment and having a relative refractive index that is less than the relative refractive index of the central core segment and greater than the relative refractive index of the intermediate segment; and a cladding layer on the periphery of the annular ring segment and having a relative refractive index that is less than the relative refractive index of the ring segment and greater than the relative refractive index of the moat segment.

3. The optical fiber of claim 2 wherein the central core segment has an outer radius of within the range of about 1.4 µm to about 2.1 µm.

4. The optical fiber of claim 3 wherein the depressed moat segment has an outer radius of within the range of from about 4.1 µm to about 6.8 µm.

5. The optical fiber of claim 4 wherein the intermediate segment has an outer radius of within the range of from about 5.5 µm to about 8.5 µm.

6. The optical fiber of claim 5 wherein the annular ring segment has a central radius of within the range of from about 7.2 µm to about 10.2 µm.

7. The optical fiber of claim 6 wherein the annular ring segment has a central radius of within the range of from about 7.4 µm to about 9.2 µm.

8. The optical fiber of claim 6 wherein the annular ring segment has a central radius of within the range of from about 7.7 µm to about 8.8 µm.

9. The optical fiber of claim 5 wherein the intermediate segment has an outer radius of within the range of from about 6.2 µm to about 7.8 µm.

10. The optical fiber of claim 5 wherein the intermediate segment has an outer radius of within the range of from about 6.5 µm to about 7.4 µm.

11. The optical fiber of claim 4 wherein the depressed moat segment has an outer radius of within the range of from about 4.6 µm to about 6.3 µm.

12. The optical fiber of claim 4 wherein the depressed moat segment has an outer radius of within the range of from about 4.9 µm to about 5.9 µm.

13. The optical fiber of claim 3 wherein the central core segment has an outer radius of within the range of about 1.6 µm to about 1.9 µm.

14. The optical fiber of claim 3 wherein the central core segment has an outer radius of within the range of about 1.6 µm to about 1.8 µm.

15. The optical fiber of claim 2 wherein the relative refractive index of the depressed moat segment is more negative than about −0.42%.

16. The optical fiber of claim 15 wherein the relative refractive index of the intermediate segment is within the range of from about 0.040% to about 0.072%.

17. The optical fiber of claim 16 wherein the relative refractive index of the annular ring segment is within the range of from about 0.50% to about 0.80%.

18. The optical fiber of claim 17 wherein the relative refractive index of the annular ring segment is within the range of from about 0.56% to about 0.74%.

19. The optical fiber of claim 17 wherein the relative refractive index of the annular ring segment is within the range of from about 0.59% to about 0.70%.

20. The optical fiber of claim 16 wherein the relative refractive index of the intermediate segment is within the range of from about 0.048% to about 0.063%.

21. The optical fiber of claim 16 wherein the relative refractive index of the intermediate segment is within the range of from about 0.045% to about 0.066%.

22. The optical fiber of claim 15 wherein the relative refractive index of the depressed moat segment is within the range of from about −0.42% to about −0.61%.

23. The optical fiber of claim 15 wherein the relative refractive index of the depressed moat segment is within the range of from about −0.58% to about −0.50%.

24. The optical fiber of claim 2 wherein the relative refractive index of the central core segment is within the range of from about 1.51% to about 2.27%.

25. The optical fiber of claim 24 wherein the relative refractive index of the central core segment is within the range of from about 1.70% to about 2.08%.

26. The optical fiber of claim 24 wherein the relative refractive index of the central core segment is within the range of from about 1.80% to about 1.98%.

27. The optical fiber of claim 2 wherein the ratio of an outer radius of the central core segment to an outer radius of the depressed moat segment is less than or equal to about 0.36.

28. The optical fiber of claim 27 wherein the ratio of an outer radius of the core segment to an outer radius of the moat segment is within the range of from about 0.28 to about 0.34.

29. The optical fiber of claim 27 wherein the ratio of an outer radius of the core segment to an outer radius of the moat segment is within the range of from about 0.30 to about 0.325.

30. The optical fiber of claim 1, further including a MPI of less than or equal to about −45 dB at a wavelength of about 1550 nm.

31. The optical fiber of claim 30, further including a MPI of less than or equal to about −50 dB at a wavelength of about 1550 nm.

32. The optical fiber of claim 30, further including a pin array bend loss of less than or equal to about 20 dB.

33. The optical fiber of claim 30, further including a pin array bend loss of less than or equal to about 17 dB.

34. The optical fiber of claim 1 wherein the relative refractive index profile is further selected to provide a dispersion between about −160 ps/nm-km to about −110 ps/nm-km at a wavelength of about 1550 nm.

35. The optical fiber of claim 34 wherein the relative refractive indices are further selected to provide a k value of within the range of from about 45 to about 75.

36. The optical fiber of claim 1 wherein the refractive index profile is further selected to provide an effective area of greater than about 15 µm$^2$ at a wavelength of about 1550 nm.

37. The optical fiber of claim 36 wherein the refractive index profile is further selected to provide an effective area of greater than about 16 µm$^2$ at a wavelength of about 1550 nm.

38. The optical fiber of claim 1, further including a pin array bend loss of less than or equal to about 30 dB at a wavelength of about 1550 nm.

39. The optical fiber of claim 1 wherein the relative refractive index profile is further selected to provide a dispersion within the range of from about −80 ps/nm-km to about −200 ps/nm-km at a wavelength of about 1550 nm.

40. The optical fiber of claim 1 wherein the relative refractive indices are further selected to provide a k value of within the range of from about 40 to about 80.

41. The optical fiber of claim 1 wherein the refractive index is further selected to provide a cut-off wavelength of less than about 1975 nm for the highest of $LP_{02}$ and $LP_{11}$ mode.

42. An optical fiber communication system, comprising:
  an optical transmitter adapted to transmit an optical signal;
  an optical transmission fiber in optical communication with the transmitter and adapted to receive the optical signal;
  a dispersion compensating fiber in optical communication with the transmission fiber and adapted to receive the optical signal, the dispersion compensating fiber comprising:
    a central core segment having a relative refractive index;
    a depressed moat segment on the periphery of the central core segment and having a relative refractive index that is less than the relative refractive index of the central core segment;
    an intermediate segment on the periphery of the moat segment and having a relative refractive index that is less than the relative refractive index of the core segment and greater than the relative refractive index of the moat segment;
    an annular ring segment on the periphery of the intermediate segment and having a relative refractive index that is less than the relative refractive index of the central core segment and greater that the relative refractive index of the intermediate segment; and
    a cladding layer on the periphery of the annular ring segment and having a relative refractive index that is less that the relative refractive index of the annular ring segment and greater than the relative refractive index of the depressed moat segment;
  wherein the relative refractive indices of the compensating fiber are selected to provide the compensating fiber with:
    negative dispersion at a wavelength of about 1550 nm;
    negative dispersion slope at a wavelength of about 1550 nm;
    a k value of within the range of less than or equal to about 100 at a wavelength of about 1550 nm; and
    MPI less than −40 dB at 1550 nm; and
  an optical receiver adapted in optical communication with the dispersion compensating fiber and adapted to receive the optical signal.

43. The optical fiber of claim 42 wherein a pin array bend loss of less than or equal to about 30 dB at 1550 nm.

44. The system of claim 43 wherein a pin array bend loss of less than or equal to about 20 dB at 1550 nm.

45. The system of claim 43 wherein a pin array bend loss of less than or equal to about 17 dB.

46. A dispersion compensating optical fiber, comprising:
  a central core segment having a relative refractive index and an outer radius;
  a depressed moat segment on the periphery of the central core segment and having a relative refractive index that is less than the relative refractive index of the central core segment, and an outer radius;
  an intermediate segment on the periphery of the moat segment and having a relative refractive index that is less than the relative refractive index of the core segment and greater than the relative refractive index of the moat segment, and an outer radius;
  an annular ring segment on the periphery of the intermediate segment and having a relative refractive index that is less than the relative refractive index of the central core segment and greater than the relative refractive index of the intermediate segment, and an outer radius; and
  a cladding layer on the periphery of annular ring segment and having a relative refractive index that is less than the relative refractive index of the ring segment and greater than the relative refractive index of the moat segment, and an outer radius;
  wherein the relative refractive index profile are chosen from the following ranges:
    the relative index of the central core segment within the range of from about 1.51% to about 2.27%;
    the relative index of the depressed moat segment within the range of from about −0.42% to about −0.62%;
    the relative index of the intermediate segment within the range of from about 0.040% to about 0.072%;
    the relative index of the annular ring segment within the range of from about 0.50% to about 0.74%;
    the outer radius of the central core segment within the range of from about 1.4 μm to about 2.1 μm;
    the outer radius of the depressed moat segment within the range of from about 4.1 μm to about 6.2 μm;
    the outer radius of the intermediate segment within the range of about 5.9 μm to about 8.2 μm; and
    the outer radius of the annular ring segment within the range of from about 7.2 μm to about 9.3 μm;
  wherein the relative refractive indexes and radii are selected to provide:
    negative dispersion at a wavelength of about 1550 nm;
    negative dispersion slope at a wavelength of about 1550 nm;
    a κ value of less than or equal to about 100 at a wavelength of about 1550 nm;
    a MPI of less than −40 dB at 1550 nm, and
    a pin array bend loss of less than or equal to about 30 dB.

47. The optical fiber of claim 46 wherein the relative refractive profile is chosen from the following ranges:
  the relative refractive index of the central core segment within the range of from 1.70% to 2.08%;
  the relative refractive index of the depressed moat segment within the range of from −0.47% to −0.57%;
  the relative refractive index of the intermediate segment within the range of from 0.045% to 0.065%;
  the relative refractive index of the annular ring segment within the range of from about 0.56% to about 0.68%;
  the outer radius of the central core segment within the range of from 1.6 μm to 1.9 μm;
  the outer radius of the depressed moat segment within the range of from 4.6 μm to 5.7 μm;
  the outer radius of the intermediate segment within the range of from 6.2 μm to 7.5 μm; and
  the outer radius of the annular ring segment within the range of from 7.4 μm to 9.2 μm; and wherein the relative refractive indexes profile is selected to provide:
- dispersion within the range of from about −80 ps/nm-km to about −200 ps/nm-km;
- a κ value of within the range of from about 40 to about 90; and
- a pin array bend loss of less than or equal to about 20 dB.

48. The optical fiber of claim 46 wherein the relative refractive index profile is chosen from the following ranges;
- the relative refractive index of the central core segment within the range of from 1.80% to 1.98%;
- the relative refractive index of the depressed moat segment within the range of from −0.49% to −0.55%;
- the relative refractive index of the intermediate segment within the range of from 0.048% to 0.063%;
- the relative refractive index of the annular ring segment within the range of from 0.59% to 0.70%;
- the outer radius of the central core segment within the range of from 1.6 μm to 1.8 μm;
- the outer radius of the depressed moat segment within the range of from 4.5 μm to 5.8 μm;
- the outer radius of the intermediate segment within the range of from 6.5 μm to 7.2 μm; and
- the outer radius of the annular ring segment within the range of from 7.8 μm to 8.8 μm; and wherein the relative refractive index profile are further selected to provide:
- dispersion within the range of from about −110 ps/nm-km to about −165 ps/nm-km at a wavelength of about 1550 nm;
- a κ value of within the range of from about 45 to about 75 at a wavelength of about 1550 nm; and
- a pin array bend loss of less than or equal to about 17 dB at a wavelength of 1550 nm.

* * * * *

UNITED STATES PATENT AND TRADEMARK OFFICE
CERTIFICATE OF CORRECTION

PATENT NO. : 6,665,481 B2
DATED : December 16, 2003
INVENTOR(S) : Hebgen et al.

It is certified that error appears in the above-identified patent and that said Letters Patent is hereby corrected as shown below:

Column 2,
Line 24, "cut-off" should be -- cutoff --.

Column 6,
Line 52, "E.g." should be -- e.g. --.
Line 65, "Mulipath" should be -- Multipath --.

Column 7,
Line 64, "discreet" should be -- discrete --.

Column 13,
Line 14, delete "from".

Column 15,
Line 12, "cut-off" should be -- cutoff --.
Lines 39 and 43, "that" should be -- than --.

Column 16,
Line 21, "are" should be -- is --.
Line 36, before "about" insert -- from --.
Line 59, delete "about" (both occurrences).

Column 18,
Line 9, "are" should be -- is --.

Signed and Sealed this

Twenty-second Day of June, 2004

JON W. DUDAS
*Acting Director of the United States Patent and Trademark Office*